(12) United States Patent
McDermott et al.

(10) Patent No.: US 6,217,625 B1
(45) Date of Patent: Apr. 17, 2001

(54) PELLETIZED PULP

(75) Inventors: Eddy T. McDermott, Kevil; Joe Oktela, Paducah, both of KY (US)

(73) Assignee: Westvaco Corporation, Stamford, CT (US)

( * ) Notice: Subject to any disclaimer, the term of this patent is extended or adjusted under 35 U.S.C. 154(b) by 0 days.

(21) Appl. No.: 09/436,040

(22) Filed: Nov. 8, 1999

(51) Int. Cl.⁷ .................................................. C10L 5/00
(52) U.S. Cl. ................ 44/550; 44/595; 44/596; 44/597; 44/598
(58) Field of Search .............. 44/550, 595, 596, 44/597, 598

(56) References Cited

U.S. PATENT DOCUMENTS

| 4,529,407 | * 7/1985 | Johnston et al. | 44/596 |
| 4,560,527 | 12/1985 | Harke et al. | 264/500 |
| 4,619,862 | 10/1986 | Sokolowski et al. | 428/221 |
| 5,209,186 | 5/1993 | Dewing | 119/172 |

FOREIGN PATENT DOCUMENTS 0039522  11/1981  (EP) .

OTHER PUBLICATIONS

"New Technique to Pelletize and Dry Pulp, Sludge and Bark at low Temperatures", by Louis Barre and Marcel Bilodeau, presented at the 84th Annual Meeting, Technical Section, CPPA, Jan. 27–28, 1998, pp. A119–A122.

* cited by examiner

Primary Examiner—Margaret Medley
Assistant Examiner—Cephia D. Toomer

(57) ABSTRACT

A pelletized cellulosic pulp product is produced from a delignified and bleached paper pulp raw material that is useful as a combustion material. The size, shape, density and glazed outer surface of the pelletized product contributes to controlled combustion of the pellets to support a smoldering burn in use.

4 Claims, No Drawings

PELLETIZED PULP

BACKGROUND OF INVENTION

The present invention relates to a process for the treatment of a cellulosic pulp material to produce a pelletized product.

It is known, for example, to treat fibrous cellulosic containing raw materials from various sources to produce various products such as animal litter, bedding materials, liquid absorbents and shock absorbing materials for packaging. The fibrous materials employed for such purposes include for the most part various kinds of paper pulp, recycled pulp from a recycling operation, paper mill sludge, wastepaper and combinations thereof. In addition to these fibrous materials, various additives are used to give specific characteristics to the processed raw material including the addition of both organic and inorganic fillers. Examples of such processes and products are disclosed in the article "New Technique to Pelletize and Dry Pulp, Sludge and Bark at low temperatures", by Louis Barre and Marcel Bilodeau, presented at the 84th Annual Meeting, technical Section, CPPA, Jan. 27–28, 1998; U.S. Pat. Nos. 4,560,527; 4,619,862; 5,209,186; and European Patent Application EP 0 039 522. In the EP application, fibrous raw materials including groundwood, thermomechanical wood pulp, sulphate and sulphite pulp including inorganic fillers such as kaolin, talcum, gypsum and chalk are processed into pellets useful for either a liquid absorbent or a shock absorbing packaging material.

In contrast to the above prior art, the present invention is intended to produce a pelletized cellulosic pulp product that has controlled combustion characteristics when burned to produce flavorless smoke compounds. Moreover, since the cellulosic pulp product of the present invention is utilized directly or indirectly in the smoking and curing of food products for human consumption, the raw material of the present invention is preferably a delignified and bleached chemical paper pulp that is suitable for use in the manufacture of FDA approved paper and paperboard products for use in packaging food products.

SUMMARY OF INVENTION

The present invention relates to the processing of a cellulosic pulp raw material and the novel products produced using that raw material. As referred to herein, the term "cellulosic pulp" is used to refer broadly to processed cellulosic fibers produced using a conventional papermaking pulping process. The pulp so produced is preferably substantially totally free from any natural binders such as lignin, tars and pitches which normally occur in plant life, and does not contain any additives. These binders are normally removed by extraction and bleaching during the pulping process. Therefore, cellulosic pulp which has undergone digestion and bleaching in a paper pulping operation is particularly suited as the raw material for the present invention. Moreover, in view of the desired secondary use of the products produced by the present invention (e.g., to treat food for human consumption), the preferred raw material is pulp that can be used in the manufacture of paper and paperboard products that are FDA approved for food packaging as prescribed in Part 176 of the Food Additives Amendment and the Regulations issued by the Food and Drug Administration.

The products produced in accordance with the present invention are preferably elongated pellets having a specified density, aspect ratio and moisture content with a glazed outer surface to support a controlled, smoldering burn when used as a combustion product. The pellets have a preferred density of about 38 lbs/cu.ft, an aspect ratio of about 3 to 1 (length to diameter), and a moisture content of about 8–10%. In accordance with the invention, the cellulosic pulp raw material is fed into a pelletizing apparatus where it is forced through a rotary die to form pellets of the desired size, shape and density. After processing, the pellets are conditioned to the desired moisture content and temperature before being bagged for shipment.

DETAILED DESCRIPTION

The starting raw material for preparing the combustion product of the present invention is a lignin free hardwood cellulosic pulp that is suitable for use in the manufacture of paper and paperboard for food packaging applications. The pulp is taken from the feed line of a conventional paper pulping process after extraction and bleaching. At this point, the pulp is in a fluffy state with a moisture content of about 14–18%, and a temperature of about 100 degrees F. The pulp is fed by gravity into a pelletizing apparatus an example of which is a Model 3016-4 Pellet Mill supplied by the California Pellet Mill Company, Crawfordville, Ind. The preferred pelletizing die is a 929-25 die which is designed to provide a spaghetti-like product of about 5/16 inch (8 mm) diameter. This product is preferably cut into lengths of between about 3/4 and 1 inch to form the pellets. It will be understood, however, that it is not unusual for the product to break off on its own so that the length dimension may vary. It will be appreciated, moreover, that other dies which produce pellets from about 1/4 to 3/8 inch (4–10 mm) in diameter, and from about 1/2 to 1 1/2 (12–40 mm) in length are suitable for the present invention.

The pulp at a moisture content of about 14–18% is forced into the pelletizer. After exiting the pelletizer die, the extruded strands are mechanically chopped with a suitable knife to the desired pellet length. At that point the pellets are collected on a conveyor belt for transport to a bagging station. During the pelletizing process considerable dusting occurs as the pellets reach a temperature of about 200 degrees F. due to frictional forces. This dust must be removed before bagging. Meanwhile, the high temperature reached in the die cavity tends to drive off some moisture to reach the desired moisture content of about 8–10%. However, the pellets cannot be bagged at such a high temperature or mold and mildew will be produced as the pellets cool and sweat. To alleviate this problem and also to remove the unwanted dust, the pellets are exposed to a plurality of stations including air jet and vacuum heads located on the conveyor belt as they proceed to the bagging station. In a preferred method, the pellets are substantially suspended on a fluidized bed of air. The air jets stir the pellets thereby cooling them and the vacuum heads remove the dust. The pellets are preferably bagged at about room temperature. If not sufficiently cooled on the conveyor belt, additional cooling air is used after bagging and before the bags are sealed.

The pelletizing step produces a product having about 8–10% moisture or about 90–92% dry fiber. The pellets have a glazed outer surface and are preferably substantially cylindrical in shape with a diameter of from about 1/4 to 3/8 inches (4–10 mm), and a length of from about 1/2 to 1 1/2 inches (12–40 mm). The pellets have a density of from about 36 to 40 lbs/cu ft, (570–640 kg/m$^3$) and preferably about 38 lbs./cu ft (608 kg/m$^3$). Pellets of the preferred size, shape and density having been found to provide controlled combustion so as to support a smoldering burn to generate aromatic wood smoke compounds suitable for the processing of meat, fish and other food products. The size, shape and density of the pellets is also designed to accommodate the requirements of the combustion process and meet the manufacturing specifications of the secondary use. These manufacturing specifications could not be satisfied with the products disclosed in the prior art.

It will be appreciated that the foregoing description of the present invention is for purposes of illustration only and should not be construed as limiting to the scope of the invention as defined in the appended claims.

What is claimed is:

1. Process for the preparation of a cellulosic pulp product designed for controlled combustion to support a smoldering burn consisting essentially of:
   (a) selecting as the cellulosic pulp raw material a delignified and bleached paper pulp suitable for use in the manufacture of FDA approved paper products for food packaging;
   (b) drying the cellulosic pulp raw material of step (a) to a moisture content of from about 14–18%; and,
   (c) subjecting the cellulosic pulp raw material of step (b) to a pelletizing process to form substantially cylindrically shaped pellets having a moisture content within the range of about 8–10%, a density of from about 570–640 Kg/m$^3$, a length of from about 12–40 mm, and a diameter of from about 4–10 mm, wherein the pellets have a glazed outer surface to provide controlled combustion and a smoldering burn in use.

2. The process of claim 1 wherein the pellets after pelletizing are subjected to a cooling step using streams of cool air to reduce the temperature of the pellets for bagging and a vacuum system to remove dust created during the pelletizing step.

3. The process of claim 2 wherein the pellets are further subjected to jets of cool air during the bagging step to substantially prevent the development of mold or mildew after bagging.

4. A pelletized combustion product prepared from a delignified and bleached paper pulp suitable for use in the manufacture of FDA approved paper products for food packaging consisting essentially of pellets having a generally cylindrical shape with a moisture content of about 8–10%, a density of from about 570–640 kg/m$^3$, a length of from about 12–40 mm and a diameter of from about 4–10 mm wherein the pellets have a glazed outer surface to provide controlled combustion and a smoldering burn in use.

* * * * *